(12) United States Patent
Ebey

(10) Patent No.: US 6,505,849 B1
(45) Date of Patent: Jan. 14, 2003

(54) BALL CLAMP TRAILER COUPLER

(75) Inventor: Edward Wayne Ebey, Wausau, WI (US)

(73) Assignee: Fulton Performance Products, Inc., Mosinee, WI (US)

( * ) Notice: Subject to any disclaimer, the term of this patent is extended or adjusted under 35 U.S.C. 154(b) by 114 days.

(21) Appl. No.: 09/771,845

(22) Filed: Jan. 29, 2001

(51) Int. Cl.$^7$ .................................................. B60D 1/06
(52) U.S. Cl. ...................................................... 280/513
(58) Field of Search ................................. 280/511, 513

(56) References Cited

U.S. PATENT DOCUMENTS

| | | |
|---|---|---|
| 2,090,113 A | 8/1937 | Dayton |
| 2,143,322 A | 1/1939 | Knobel, Jr. |
| 2,149,189 A | 2/1939 | Shaffer |
| 2,166,208 A | 7/1939 | Dayton |
| 2,170,980 A | 8/1939 | Thorp et al. |
| 2,178,094 A | 10/1939 | Berluti |
| 2,204,882 A | 6/1940 | Berluti |
| 2,363,755 A | 11/1944 | Smith |
| 2,726,099 A | 12/1955 | Nunn, Jr. |
| RE24,362 E | 9/1957 | Nunn, Jr. |
| 2,823,931 A | 1/1958 | Schrader |
| 3,130,993 A | 4/1964 | McCleary |
| 3,139,291 A * | 6/1964 | Geresy |
| 3,773,358 A | 11/1973 | Butler et al. |
| 3,954,286 A | 5/1976 | Weber |
| 4,241,935 A | 12/1980 | Vollmer et al. |
| 5,344,174 A | 9/1994 | Sanders |
| 5,632,501 A | 5/1997 | Jackson et al. |

* cited by examiner

*Primary Examiner*—Kevin Hurley
(74) *Attorney, Agent, or Firm*—Craig A. Fieschko, Esq.; DeWitt Ross & Stevens S.C.

(57) ABSTRACT

The ball clamp coupler includes a coupler housing wherein a coupler socket is defined, with the coupler socket having a bottom socket opening to allow insertion of a hitch ball. A rear wall is also defined within the coupler housing interior adjacent the coupler socket. A ball clamp moves within the interior of the coupler housing between an open (uncoupled) state wherein the ball clamp is substantially removed from the coupler socket, and a closed (coupled) state wherein the ball clamp is substantially inserted within the coupler socket. During such motion, the ball clamp is guided against the rear wall, whereby engagement of the hitch ball will situate the ball clamp between the hitch ball and the rear wall. The ball clamp is driven by a clamp driving member which extends from the interior of the coupler housing to its exterior. An actuator lever is pivotally affixed to the coupler housing at a lever pivot, and is also at least pivotally affixed (and preferably also translationally affixed) to the clamp driving member at a driving member pivot outside the coupler housing. Thus, rotating the actuator lever about the lever pivot causes the actuator lever to rotate (and perhaps translate) with respect to the clamp driving member at the driving member pivot, thereby moving-the clamp driving member and the ball clamp between the open (uncoupled) state and the closed (coupled) state.

23 Claims, 3 Drawing Sheets

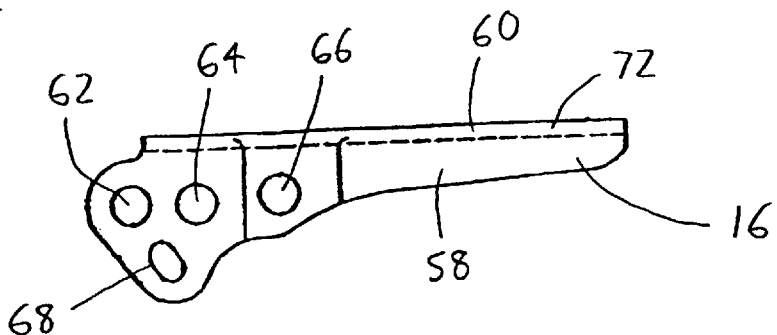
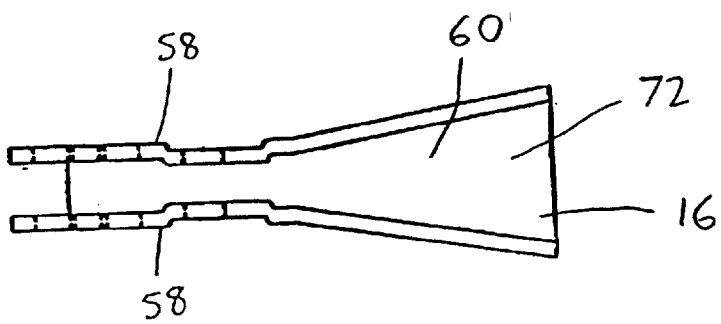
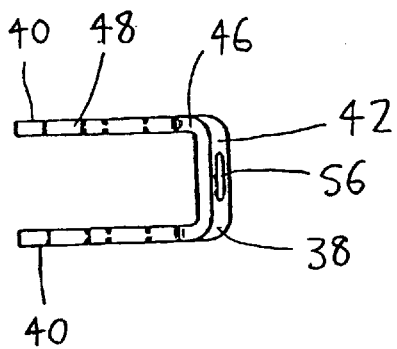
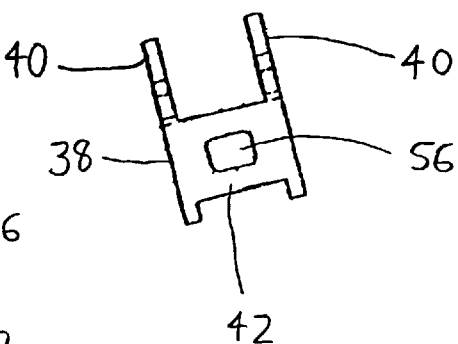
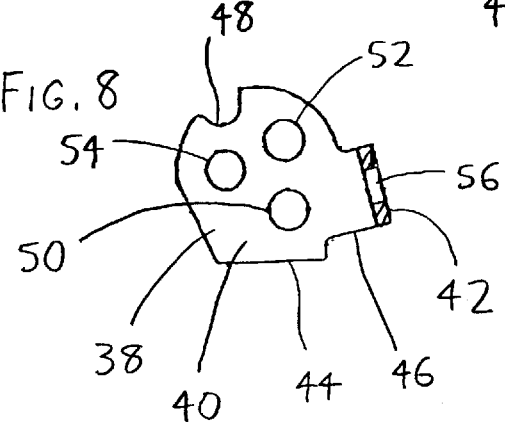

BALL CLAMP TRAILER COUPLER

FIELD OF THE INVENTION

This disclosure concerns an invention relating to ball clamps for engaging hitch balls such as those used on trailers and towing vehicles.

BACKGROUND OF THE INVENTION

Ball- and socket-type trailer hitches are commonly used in connection with automobiles, tractor trucks, and/or other vehicles when towing trailers and other wheeled implements. Examples of such prior couplers are given in, for example, U.S. Pat. No. 2,090,113 to Dayton; U.S. Pat. No. 2,143,322 to Knobel, Jr.; U.S. Pat. No. 2,149,189 to Shaffer; U.S. Pat. No. 2,166,208 to Dayton; U.S. Pat. No. 2,170,980 to Thorp et al.; U.S. Pat. Nos. 2,178,094 and 2,204,882 to Berluti; U.S. Pat. No. 2,363,755 to Smith; U.S. Pat. No. 2,726,099 and RE 24,362 to Nunn, Jr.; U.S. Pat. No. 2,823,931 to Schrader; U.S. Pat. No. 3,130,993 to McCleary; U.S. Pat. No. 3.773,358 to Butler et al.; U.S. Pat. No. 3,954,286 to Weber, U.S. Pat. No. 4,241,935 to Vollmer et al.; U.S. Pat. Nos. 5,344,174 to Sanders; and 5,632,501 to Jackson et al. Certain features are highly desirable for incorporation within a coupler, such as high coupling strength; easy actuation by the user between the open (uncoupled) and closed (coupled) states, preferably with "single motion" (i.e., solely rotational or translational) action; easy and inexpensive manufacture; and easy and inexpensive field maintenance. The coupler designs of the aforementioned patents are not believed to fulfill all of these goals, or otherwise do not achieve what is regarded to be an optimal balance between these sometimes-competing goals. Thus, the following invention has been developed to overcome the disadvantages of the prior couplers in this field.

SUMMARY OF THE INVENTION

The invention involves a ball clamp coupler which is intended to at least partially solve the aforementioned problems. To give the reader a basic understanding of some of the advantageous features of the invention, following is a brief summary of preferred versions of the ball clamp coupler, with reference being made to the drawings to allow the reader to visualize examples of the structures being described. As this is merely a summary, it should be understood that more details regarding the preferred versions may be found in the Detailed Description set forth elsewhere in this document. The claims set forth at the end of this document then define the various versions of the invention in which exclusive rights are secured.

The ball clamp coupler (item 10 in FIGS. 1 and 2) includes a coupler housing 12 having an interior wherein a coupler socket 26 is defined. The coupler socket has a bottom socket opening 28 to allow insertion of a hitch ball B (shown in phantom in FIGS. 1 and 2) within the socket opening to rest within the coupler socket. Within the coupler housing interior, a rear wall 34 is also defined adjacent the coupler socket, with the rear wall preferably having a planar configuration. A ball clamp 14 is movable within the coupler housing interior so that it may be inserted within the coupler socket 26 by varying degrees, i.e., so that it may move between an open (uncoupled) state wherein the ball clamp is removed from the coupler socket to its maximum extent (FIG. 1), and a closed (coupled) state wherein the ball clamp is inserted within the coupler socket to its maximum extent (FIG. 2). As the ball clamp moves within the coupler housing interior, it is guided against the rear wall, whereby the ball clamp is sandwiched between the hitch ball and the rear wall when the hitch ball is engaged. The rear wall prevents the hitch ball from pushing the ball clamp away from the coupler socket, and therefore the ball clamp can more strongly grasp the hitch ball.

The ball clamp 14 is driven by a clamp driving member 86, which is affixed to the ball clamp and extends from :the interior of the coupler housing 12 to its exterior at a driving member aperture 36. An actuator lever 16 is pivotally affixed to the coupler housing at a lever pivot 70, and is also at least pivotally affixed to the clamp driving member at a driving member pivot 88 (e.g., a pivot pin) outside the coupler housing. As will be discussed later in this document, the actuator lever is preferably also translatably affixed to the clamp driving member at the driving member pivot, as by situating the driving member pivot in an elongated slot 68. Thus, rotating the actuator lever about the lever pivot causes the actuator lever to rotate (and perhaps translate) with respect to the clamp driving member at the driving member pivot, thereby moving the clamp driving member and in turn moving the ball clamp between the open (uncoupled) state and the closed (coupled) state. The rear wall 34 within the coupler housing interior preferably slopes downwardly away from the coupler housing and forwardly toward the coupler socket so that as the clamp driving member urges the ball clamp downward, it will also urge the ball clamp forwardly into the coupler socket 26 to better grasp a hitch ball B therein.

The ball clamp 14 preferably includes an engagement face 94 which faces the coupler socket 26 and a lower ball clamp face 98 situated below and adjacent to the engagement face. The engagement face is configured to engage a hitch ball B within the coupler socket. The lower ball clamp face preferably slopes downwardly and rearwardly away from the coupler socket. When the lower ball clamp face is oriented in this manner, when a hitch ball encounters the lower ball clamp face, the lower ball clamp face will urge the hitch ball forwardly into the coupler socket rather than the hitch ball ineffectively pushing the ball clamp up into the interior of the coupler housing without the hitch ball moving into the coupler socket to be engaged.

While the lever pivot 70 (and thus the actuator lever 16) may be pivotally attached directly to the coupler housing 12, it is preferred to instead provide it on an actuator bracket 38 which is affixed to the exterior of the coupler housing. Where the clamp driving member 86 extends from the interior of the coupler housing to its exterior, the clamp driving member may extend from the housing adjacent the actuator bracket. The driving member pivot 88 may then affix the clamp driving member to the actuator lever adjacent the actuator bracket and outside the coupler housing.

As noted previously, the actuator lever 16 is also preferably translatably affixed to the clamp driving member 86. This may be done by providing the aforementioned slot 68 within the actuator lever, and also providing a protrusion 88 on the clamp driving member (e.g., a protruding pin) at the driving member pivot, whereby the protrusion may rotate and translate within the slot. By allowing the protrusion to translate within the slot as the actuator lever rotates, the rotating motion of the actuator lever is converted into translational motion of the clamp driving member (and thus the ball clamp 14). This efficient conversion of rotational motion to translational motion allows greater mechanical advantage, and it also reduces wear between the actuator lever and clamp driving member because the slot allows relative motion between the parts to relieve stress.

Additionally, where the actuator lever is rotatably mounted to an actuator bracket 38 which is in turn mounted to the coupler housing 12, this slot compensates for imprecision in the manufacturing process: it allows minor error in placement of the actuator bracket on the coupler housing while still providing a smoothly rotating actuator lever. This helps reduce the number of discarded or refurbished couplers during manufacturing and thereby helps preserve time, manpower, and facility resources.

The actuator lever 16 may be provided with a latch 74 which can engage the coupler housing 12 (or the actuator bracket 38, if present) to fix the actuator lever (and thus the ball clamp 14) in position. For example, the latch may be rotatably mounted on the actuator lever, and may be pivotable to engage the actuator bracket to fix the actuator lever (and thus the clamp driving member 86 and ball clamp) with respect to the actuator bracket. The latch may be spring-biased to automatically engage the coupler housing or actuator bracket when released, thereby allowing automated latching and decreasing the chances of accidental release of the hitch ball B from the coupler socket 26. Preferably, the actuator lever extends rearwardly away from the coupler socket so that it does not rest above the coupler socket or obstruct a user's view, and so that the actuator lever is shielded from inadvertent actuation (as by accidentally striking or catching on objects in its surroundings). It is preferred that the latch be situated on the side of the coupler housing (or actuator bracket) opposite the coupler socket (i.e., facing away from the juncture between the towing and towed vehicles), and it also preferably rests beneath the actuator lever so that it rests in a relatively unexposed/ protected area to prevent its accidental disengagement.

The ball clamp coupler also preferably allows the ball clamp 14 to be locked into the open and/or closed states to prevent unauthorized use or theft. This may be done by providing the coupler housing 12 (or the actuator bracket 38) with a anchoring aperture 52, and providing the actuator lever 16 with a lever locking aperture 64. When the actuator lever is rotated to situate the ball clamp within the coupler socket 26 (FIG. 2), the lever locking aperture and the lever locking aperture are adjacently aligned to receive a locking member (e.g., the shackle of a padlock) therein, and therefore the ball clamp can be locked into the closed state. Additionally, the lever locking aperture may be located on the actuator lever in such a position that it is unobstructed to receive a locking member therein when the actuator lever is rotated to withdraw the ball clamp from the coupler socket 26 (FIG. 1), so that the ball clamp can be locked into the open state.

The foregoing arrangement is preferably configured so that the lever pivot 70 is unobstructed when the ball clamp is in the closed state (when it is moved to its greatest extent into the coupler socket 26, as in FIG. 2), and/or when the ball clamp is in the open state (when it is moved to its greatest extent out of the coupler socket, as in FIG. 1), so that the lever pivot is easily accessed for purposes of installation and maintenance. As an example, if the foregoing anchoring aperture 52 is provided, it may be situated and configured so that the lever locking aperture and the lever pivot are adjacently aligned when the actuator lever 16 is rotated to withdraw the ball clamp 14 from the coupler socket 26 (i.e., when the ball clamp is in the open state). This allows the lever pivot to be easily accessed through the lever locking aperture for maintenance when the actuator lever is in the open state. The coupler housing (or the actuator bracket, if provided) also preferably includes a pin access aperture 50 adjacent to the lever locking aperture, wherein the pin access aperture and the lever pivot are adjacently aligned when the actuator lever is rotated to situate the ball clamp within the coupler socket 26 (i.e., when the ball clamp is in the closed state). This also provides easier installation and maintenance.

Apart from the advantages noted above, the invention is also believed to provide several other advantages which are absent from the prior art, or which are at least presented in the prior art in an inferior manner. First, by providing the driving member pivot 88 outside the coupler housing 12 (e.g., on the actuator bracket 38), the clamp driving member 86 (and thus the ball clamp 14) may be more easily removed and replaced since the coupler housing—which is generally the largest structure in most ball clamp couplers—need not be disassembled to allow removal of the clamp driving member. This provides significant assembly and maintenance advantages over couplers having a driving member pivot within the coupler housing, since these make it difficult (if not practically impossible) to remove and replace the clamp driving member. In these ball clamp couplers, replacement of a defective ball clamp and/or clamp driving member generally requires that the coupler housing be substantially disassembled and/or replaced, which is highly problematic since the coupler housing is generally welded to a trailer.

Second, significant assembly and maintenance advantages arc also attained by situating the lever pivot 70 outside the coupler housing 12 (e.g., on the actuator bracket 38), particularly if the driving member pivot 88 is also situated outside the coupler housing 12. This arrangement allows the actuator lever 16 to be more readily removed and replaced than in prior ball clamp couplers wherein the lever pivot is within the coupler housing since the coupler housing will not require disassembly (or at least should avoid significant disassembly).

Further advantages, features, and objects of the invention will be apparent from the following detailed description of the invention in conjunction with the associated drawings.

BRIEF DESCRIPTION OF THE DRAWINGS

FIG. 5 is a side elevational view of the actuator lever 16 of FIGS. 1–3.

FIG. 6 is a bottom plan view of the actuator lever 16 of FIGS. 1–3 and 5.

FIG. 7 is a top plan view of the actuator bracket 38 of FIGS. 1–3.

FIG. 8 is a side elevational view of the actuator bracket 38 of FIGS. 1–3 and 7. FIG. 9 is a rear elevational view of the actuator bracket 38 of FIGS. 1–3, 7, and 8, shown with the latching member 42 aligned perpendicular to the viewer's line of sight.

DETAILED DESCRIPTION OF PREFERRED EMBODIMENTS OF THE INVENTION

Figure 1:
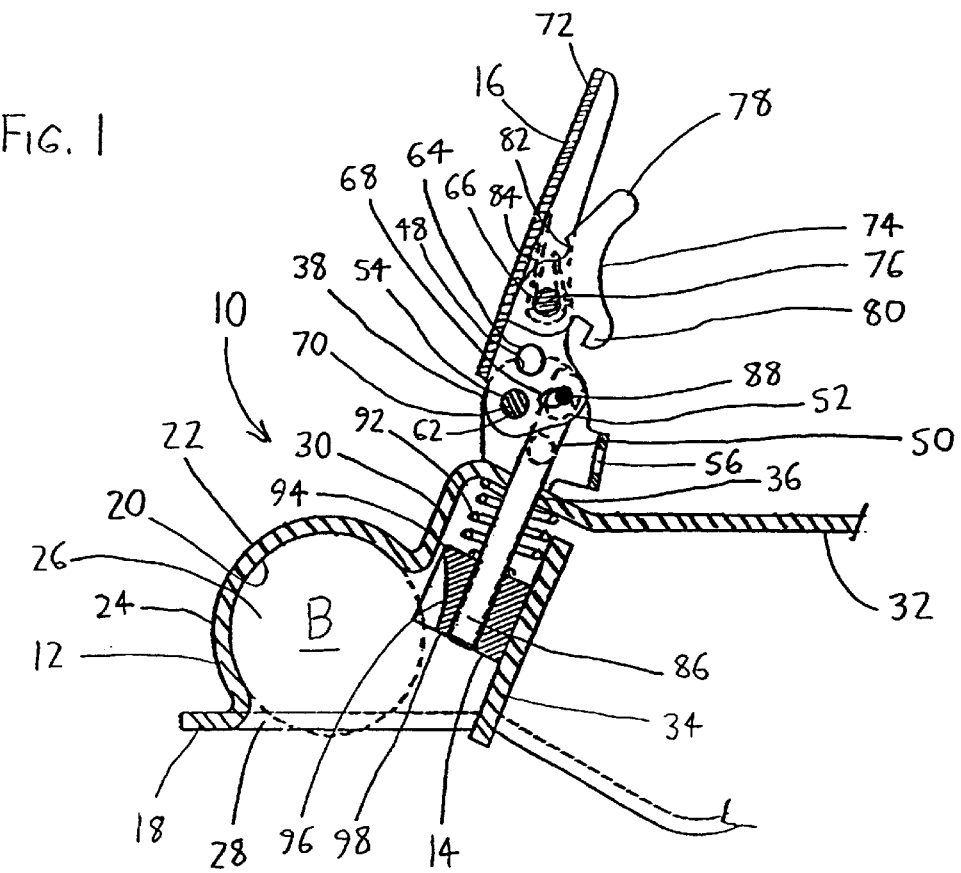
FIG. 1 is a side elevational view of an exemplary ball clamp coupler 10 in accordance with the invention, shown in section from a plane situated between the actuator bracket 38 and the actuator lever 16 (as shown at line 2—2 in FIG. 3), and with the actuator lever 16 in the up (open) position (i.e., with the ball clamp 14 in the open/disengaged position).
Figure 2:
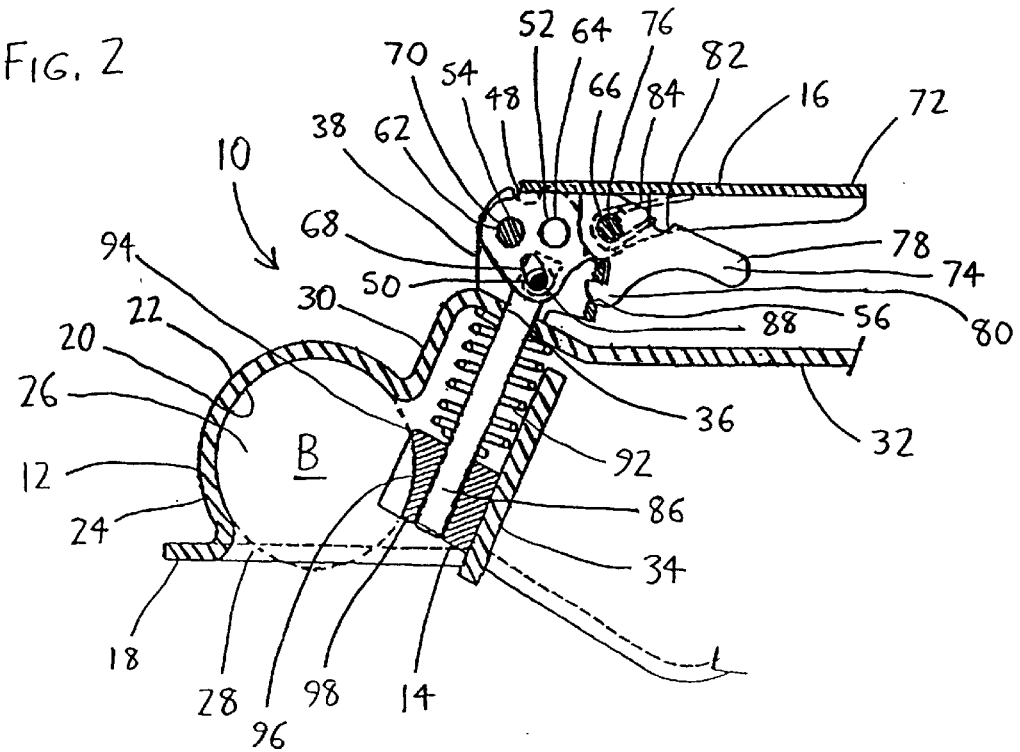
FIG. 2 is a side elevational view of the ball clamp coupler 10 shown in section from plane 2—2 in FIG. 3, and with the actuator lever 16 in the down (closed) position (i.e., with the ball clamp 14 in the closed/engaged position).
Figure 3:
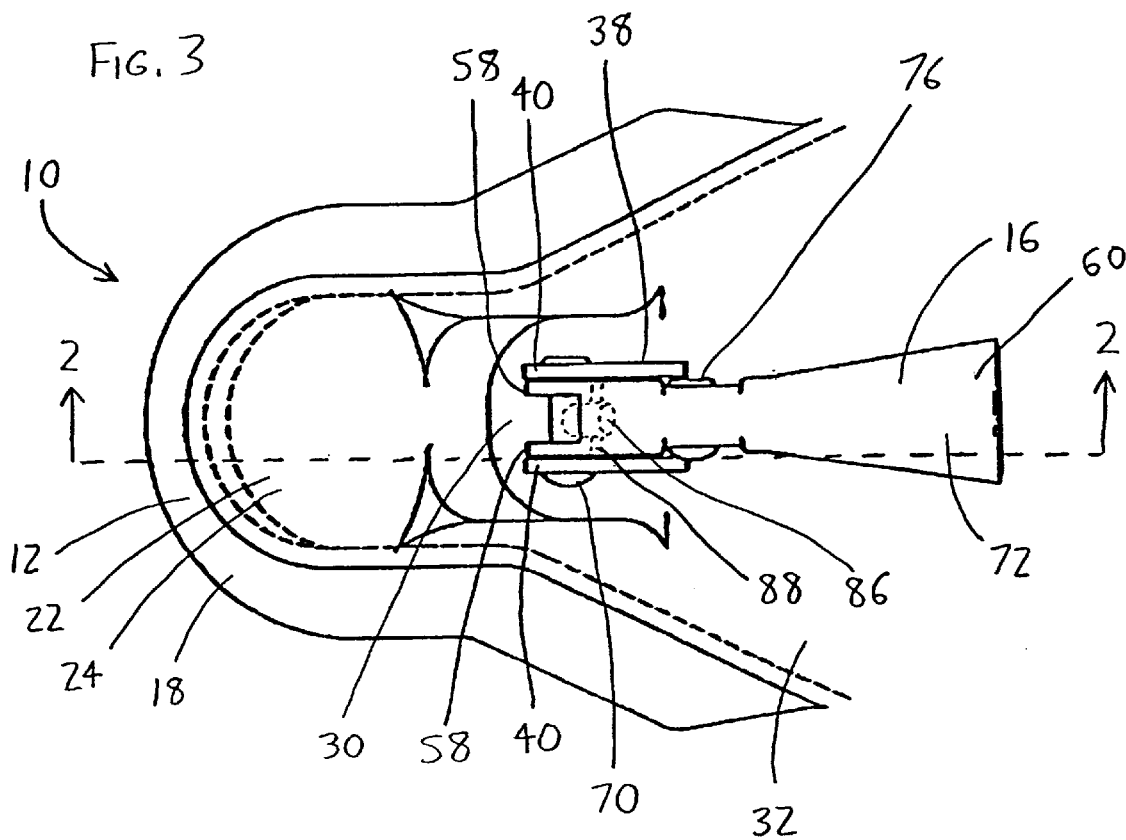
FIG. 3 is a top plan view of the ball clamp coupler 10 of FIG. 2, shown with the actuator lever 16 in the down (closed) position.

A particularly preferred embodiment of the invention will now be described in detail, with reference generally being made to FIGS. 1–3 unless otherwise noted. In FIGS. 1–3, a ball clamp coupler is designated generally by the reference numeral 10, and is shown in FIGS. 1–2 with a spherical hitch ball B (shown in phantom) which is intended to be received by the coupler 10 and locked therein between a coupler housing 12 and a coupler ball clamp 14 when an actuator lever 16 is manipulated. FIG. 1 illustrates the ball clamp 14 and the actuator lever 16 in the open/disengaged state, and FIG. 2 shows the ball clamp 14 and the actuator lever 16 in the closed/engaged state. Each of the coupler housing 12, the ball clamp 14, and the actuator lever 16 will now be discussed in turn.

The coupler housing 12 includes a housing socket wall 24 having a generally semi-spherical interior and exterior surfaces 20 and 22 (that is, the interior surface 20 and exterior surface 22 have contours which generally correspond to a portion of a spherical surface). The interior surface 20 of the housing socket wall 24 defines a coupler socket 26 having a bottom socket opening 28, and is shaped generally complimentary to the hitch ball B. As best seen in FIGS. 1 and 2, along the top of the coupler 10, the housing socket wall 24 is connected to a box-like clamp enclosure wall 30, which then extends rearwardly to a connection flange 32 which is used to connect the coupler 10 to a vehicle by any appropriate means (e.g., by welding, bolting, etc.). The coupler housing 12 additionally includes a rear wall 34 within its interior, with the rear wall 34 being situated adjacent the clamp enclosure wall 30 to allow the functionality described later in this document. The rear wall 34 slopes downwardly away from the clamp enclosure wall 30 and forwardly towards the coupler socket 26. Above and between the housing socket wall 24 and the rear wall 34, a circular driving member aperture 36 is defined within the clamp enclosure wall 30.

An actuator bracket 38 is preferably provided atop the coupler housing 12, and more specifically atop its clamp enclosure wall 30 and adjacent to the driving member aperture 36. The actuator bracket 38 will now be discussed with reference to FIGS. 7–9, wherein the actuator bracket 38 is shown without any surrounding structure for sake of clarity; in this respect, it is noted that not all of the following structure has been labeled in FIGS. 1 and 2 so as to better preserve the clarity of those Figures. Referring particularly to the top view of FIG. 7, the actuator bracket 38 is seen to have a furcated or U-shape wherein a pair of generally parallel opposing bracket sides 40 are joined by a bracket latching member 42. Referring particularly to FIG. 8, the bracket sides 40 are seen to have a bracket mounting base 44 at which the actuator bracket 38 is affixed to the clamp enclosure wall 30 (and more generally to the coupler housing 12) by means of welding, insertion, and/or other modes of attachment. The bracket latching member 42 is situated rearwardly of the bracket mounting base 44 at the end of a bracket leg 46 which protrudes slightly outwardly from the major part of the bracket sides 40, and which thus situates the bracket latching member 42 further rearward from the major part of the bracket sides 40. Near the top of each bracket side 40, and situated slightly closer to the forward side of the actuator bracket 38, a bracket locking notch 48 is defined on the outer perimeter of each bracket side 40. Within the perimeter of each bracket side 38, several apertures are defined. Initially, a pin access aperture 50 is defined adjacent the bracket mounting base 44. Above the pin access aperture 50 and situated slightly rearwardly with respect to the coupler socket 26, an anchoring aperture 52 is defined. A pivot aperture 54 is then defined forwardly from and above the pin access aperture 50, and forwardly from the anchoring aperture 52. Finally, as shown best in FIG. 9, a latching aperture 56 is defined on the bracket latching member 42.

The actuator lever 16 is then shown without any surrounding structure in FIGS. 5 and 6, but is otherwise shown in conjunction with the other elements of the coupler 10 in FIGS. 1–3. Referring initially to FIGS. 5 and 6, the actuator lever 16 is seen to be formed of a pair of opposing generally parallel lever sides 58 joined by a top lever plate 60. A number of apertures are formed in each of the lever sides 58. Closer to the top lever plate 60 and situated generally within the same plane, a series of three apertures are formed in the following order from the forward side of the actuator lever 16 (see FIG. 5): a lever pivot aperture 62; a lever locking aperture 64; and a latch pivot aperture 66. The lever sides 58 of the actuator lever 16 also each bear a lever driving slot 68 therein, with the lever driving slot 68 being formed below the lever pivot aperture 62 and lever locking aperture 64, and being elongated in a direction extending toward the lever pivot aperture 62.

Referring to FIG. 3 in conjunction with FIGS. 5–8, the actuator lever 16 is then pinned to the actuator bracket 38 by situating its lever sides 58 between and generally parallel to the bracket sides 40, and inserting a lever pivot pin 70 within the bracket pivot aperture 54 and lever pivot aperture 62. The lever pivot pin 70 is then held in place within the bracket pivot aperture 54 and lever pivot aperture 62 by deforming its ends into flared shapes (e.g., by providing the lever pivot pin 70 as a deformable rivet). Alternatively, the lever pivot pin 70 may be maintained within the bracket pivot aperture 54 and lever pivot aperture 62 by using a bolt for the lever pivot pin 70 whereupon a nut may be affixed on its end so that it cannot slide axially out of the bracket pivot aperture 54 and lever pivot aperture 62, or by otherwise adapting the lever pivot pin 70 so that it cannot be easily axially withdrawn from the bracket pivot aperture 54 and lever pivot aperture 62.

Turning particularly to FIGS. 5 and 6, the actuator lever 16 also includes a lever handle 72 defined on its top lever plate 60, with the lever handle 72 extending rearwardly away from the coupler socket 26. As best seen in FIG. 1, a latch 74 is provided beneath the lever handle 72 and is pivotally affixed to the actuator lever 16 by pinning it to the actuator lever 16 with a latch pin 76 at the latch pivot aperture 66. The latch 74 includes a latch tail 78 extending away from the latch pin 76 and below the lever handle 72 so that a user holding the lever handle 72 may simultaneously extend his/her fingers to manipulate the latch tail 78. On the bottom of the latch 74 beneath the latch pin 76, a latch toe 80 extends outwardly so that when the actuator lever 16 is in the closed state (FIG. 2) and the latch 74 is appropriately oriented, the latch toe 80 will rest within the latching aperture 56 of the bracket latching member 42 on the actuator bracket 38 to prevent the actuator lever 16 from moving to the open state. The latch 74 additionally includes a spring engagement notch 82 whereby a latch spring 84 mounted on the latch pin 76 may have one end engage the spring engagement notch 82, and the other end may bear against the top lever plate 60 of the actuator lever 16 so that the latch spring 84 biases the lever handle 72 downwardly and the latch toe 80 forwardly. Thus, when the actuator lever 16 is moved to its closed state (FIG. 2) from its open state (FIG. 1), the latch toe 80 will tend to automatically engage the latching aperture 56 of the actuator bracket 38 unless the user holds the latch tail 78 upwardly to maintain the latch toe 80 in a disengaged position.

Referring to FIGS. 1 and 2, the ball clamp 14 is then preferably provided within the interior of the coupler housing 12 by use of the following arrangement. A clamp driving member 86 extends from the interior of the coupler housing 12 and through the driving member aperture 36 to the exterior of the coupler housing 12, with the clamp driving member 86 being oriented generally parallel to the rear wall 34 of the coupler housing 12. As best shown in FIG. 3, outside the coupler housing 12, the clamp driving member 86 extends upwardly between the bracket sides 40 of the actuator bracket 38 and between the lever sides 58 of the actuator lever 16 so that it rests generally parallel and adjacent to the bracket sides 40 and lever sides 58. As FIGS. 1–3 illustrate, the clamp driving member 86 has a driving member pin 88 extending through it and protruding therefrom so that the pin 88 is rotationally and translationally mounted within the lever driving slot 68 of the actuator lever 16 (the lever driving slot 68 not being shown in FIG. 3).

The ball clamp 14 is then affixed to the end of the clamp driving member 86 within the coupler housing 12, as by threading the end of the clamp driving member 86 to engage the ball clamp 14 (as best shown in FIGS. 1 and 2). Thus, it should be understood that as the clamp driving member 86 is driven along its axis by actuation of the actuator lever 16 about the lever pivot pin 70 from the open position shown in FIG. 1 to the closed position shown in FIG. 2, the ball clamp 14 is driven upwardly and downwardly against the rear wall 34 along its rear ball clamp face 90. A spring 92 is coaxially situated on the clamp driving member 86 to bear on the clamp enclosure wall 30 and the ball clamp 14, thereby biasing the ball clamp 14 into the closed (downward) position shown in FIG. 2.

Figure 4:
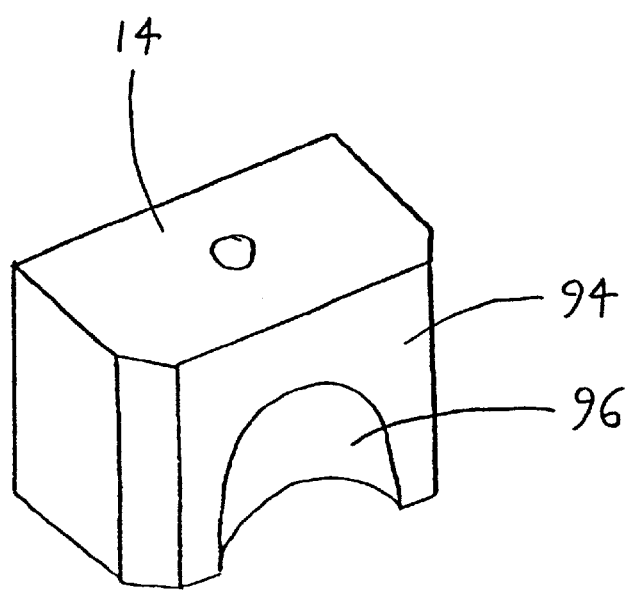
FIG. 4 is a perspective view of the ball clamp 14 of the ball clamp coupler 10 shown in FIG. 1.

Now referring to FIG. 4, the structure of the ball clamp 14 is shown in greater detail. The ball clamp 14 includes an engagement face 94 opposite the rear ball clamp face 90, wherein this engagement face 94 faces the coupler socket 26 shown in FIGS. 1 and 2. The engagement face 94 has a concavity 96 defined thereon so that the engagement face 94 is better configured to engage a hitch ball B within the coupler socket 26. FIGS. 1 and 2 also illustrate a lower ball clamp face 98 situated between the rear ball clamp face 90 and the engagement face 94. When the ball clamp 14 is installed within the coupler 10, the lower ball clamp face 98 preferably slopes downwardly and rearwardly away from the coupler socket 26 so that if the ball clamp coupler 10 is situated above a trailer hitch ball B and the ball B is directed against the lower ball clamp face 98 rather than being directed more centrally within the coupler socket 26, the lower ball clamp face 98 will tend to push the hitch ball B towards the coupler socket 26. This helps to prevent the hitch ball B from pushing the ball clamp 14 upwardly within the interior of the coupler housing 12 without being engaged by the ball clamp 14. Thus, by sloping the lower ball clamp face 98 in the manner shown and described, the trailer hitch ball B will tend to be pushed into the coupler socket 26 even if it is not precisely aligned with the coupler socket 26 during entry, and it will engage within the coupler socket 26 as the spring 92 biases the ball clamp 14 downwardly into the closed position.

Referring again to FIGS. 1 and 2, it can be seen that the various apertures in the actuator bracket 38 (the pin access aperture 50, the anchoring aperture 52, and the bracket pivot aperture 54) cooperate with the various apertures in the actuator lever 16 (the lever pivot aperture 62, lever locking aperture 64, and driving slot 68) to provide several particularly advantageous features. Initially, when looking to FIG. 1, wherein the actuator lever 16 is shown in the open/disengaged state (i.e., with the ball clamp 14 resting to a greater extent outside the coupler socket 26), it is seen that (1) the lever locking aperture 64 is aligned with the bracket locking notch 48 so that a locking member (e.g., the shackle of a padlock) can extend through the bracket locking notch 48 and the lever locking aperture 64 to lock the actuator lever 16 in the open state; and (2) the driving member pin 88, which is situated within the lever driving slot 68 of the actuator lever 16, is aligned with the anchoring aperture 52 of the actuator bracket 38 so that the driving member pin 88 may be more easily accessed for service (e.g., for installation and replacement).

Similarly, referring to FIG. 2, wherein the actuator lever 16 is shown in the closed/engaged state (i.e., with the ball clamp 14 resting to a greater extent within the coupler socket), it is seen that:

(1) the lever locking aperture 64 of the actuator lever 16 and the anchoring aperture 52 of the actuator bracket 38 are coaxially aligned so that a locking member (e.g., a shackle of a padlock) may be inserted therein to lock the actuator lever 16 to the actuator bracket 38 in the closed state; and (2) the driving member pin 88, which rides within the lever driving slot 68, is aligned within the pin access aperture 50 of the actuator bracket 38 so that it may be more easily accessed for maintenance purposes (e.g., for installation and replacement). Because the hitch ball B is engaged against the interior surface 20 of the coupler socket 26 by the engagement face 94 of the ball clamp 14 when the actuator lever 16 is in the closed state (FIG. 2), and the ball clamp 14 is prevented from rearward displacement by the rear wall 34, the coupler 10 has extremely high clamping strength in the SAE (Society of Automotive Engineers) test for longitudinal compression.

It is noted that the use of the lever driving slot 68 is particularly advantageous in that it allows both rotation and translation of the driving member pin 88 within the lever driving slot 68, which in turn allows the clamp driving member 86 to move along a single well-defined linear axis. Thus, the rotational motion of the actuator lever 16 is converted into solely (or at least primarily) linear movement of the clamp driving member 86 and the ball clamp 14 for greater mechanical efficiency, and for particularly smooth actuation. Further, the pivot driving slot 68 is preferred over an aperture wherein the driving member pin 88 may merely rotate during use since the pivot driving slot 68 will tolerate less precision in situating the actuator bracket 38 on the coupler housing 12 prior to attaching it thereon. Stated differently, use of the lever driving slot 68 allows minor errors in locating the actuator bracket 38 on the coupler housing 12, while still allowing the actuation of the actuator lever 16 to efficiently move the ball clamp 14 between open and closed states with smooth motion and without jamming.

It is also highly advantageous to provide the actuator bracket 38 atop the coupler housing 12 rather than omitting the bracket 38 and simply attaching the actuator lever 16 directly to the housing 12. The "exposed" actuator bracket 38 allows a user to readily access and remove the driving member pin 88 to disengage the actuator lever 16 from the clamp driving member 86. Thus, the entirety of the actuator bracket 38 and actuator lever 16 may be removed for replacement when they are worn to such an extent that their replacement is desirable. This allows the ball clamp assembly (the ball clamp 14, clamp driving member 86, driving member pin 88, and/or spring 92), and/or the latch mechanism (the actuator bracket 38, actuator lever 16, and associated parts) to be removed and replaced in the field rather than having to replace the entire coupler 10. Removal and replacement of the coupler 10 is extremely inconvenient because the connection flange 32 of the coupler 10 is generally welded directly to a vehicle/trailer.

It is understood that a preferred embodiment is described above and shown in the drawings to illustrate preferred features of the invention and a preferred manner in which these features may be combined. Apart from combining the different features of the preferred embodiment in varying ways, other modifications are also considered to be within the scope of the invention. Following is an exemplary list of such modifications.

First, the orientation of the actuator lever 16 with respect to the coupler housing 12 could be reversed so that the lever handle 72 is oriented forwardly (e.g., to extend over the housing socket wall 24 rather than away from it). However, it is preferred that the lever handle 72 be oriented as shown, with the lever handle 72 situated over the connection flange 32 of the coupler housing 14 rather than the housing socket wall 24, to decrease the possibility of a protruding lever handle 72 catching on surrounding objects and inadvertently releasing the ball clamp 14 from the coupler socket 26.

Second, the lever driving slot 68 could be replaced with an aperture wherein the driving member pin 88 may only rotate (and not translate). In this case, the actuator lever 16 might still be able to rotate and the clamp driving member 86 still translate, but the range of motion of the clamp driving member 86 would be decreased because the linear path traveled by the driving member pin 88 on the clamp driving member 86 will eventually not coincide with the arc swept by the driving member pin 88 as the actuator lever 16 pivots on the lever pivot pin 70. Alternatively, the driving member aperture 36 could be enlarged so as to allow the clamp driving member 86 to deviate from the axis shown in FIGS. 1 and 2 as the actuator lever 16 is swung towards the open state. However, these arrangements are less mechanically efficient and lead to a greater possibility of jamming, and they promote greater wear.

Third, another alternative arrangement would be to replace the lever driving slot 68 with an aperture wherein the driving member pin 88 may merely rotate (and not translate), and additionally omit any connection between the actuator bracket 38 and the coupler housing 12 so that the actuator bracket 38 simply "floats" atop the coupler housing 12 (with the spring 92 tending to maintain the actuator bracket 38 closely against the coupler housing 12). However, this arrangement is not as convenient to use because the actuator bracket 38 may potentially shift while in use, and additionally this arrangement will provide the coupler 10 with decreased clamping strength owing to the possibility that the actuator bracket 38 may dislodge during use. The attachment of the actuator bracket 38 atop the coupler housing 12 is extremely helpful because it firmly maintains the pivot point of the actuator lever 16 in place when the actuator lever 16 is being manipulated, and at the same time all of the pivot points which are most demanding of maintenance are left exposed outside the coupler housing 12 for easy maintenance.

Fourth, while it should be evident that the configurations and sizes of the various components discussed above may be widely varied (and thus a coupler in accordance with the invention may appear vastly different from the one illustrated in the drawings), it is particularly emphasized that the configurations of the coupler housing 12 and ball clamp 14 are particularly amenable to reconfiguration. As one example, looking to FIGS. 1–3, the coupler housing 12 is could be reconfigured to omit the strengthening flange 18, the shape of the coupler socket 26 can be modified, etc. More generally, the coupler housing 12 can be reconfigured into a wide variety of different designs, e.g., any common designs for gooseneck couplers, A-frame couplers, adjustable tongue couplers, etc. As another example, the ball clamp 14 could have a different shape; it could be made integral with the driving member 86 (which need not have a rod-like configuration); etc.

The invention is not intended to be limited to the preferred embodiments described above, but rather is intended to be limited only by the claims set out below. Thus, the invention encompasses all alternate embodiments that fall literally or equivalently within the scope of these claims. In particular, it should be understood that the ball clamp coupler can incorporate features of, or can be modified in accordance with, prior coupler designs, so long as these different embodiments meet the descriptions set forth by the following claims. Exemplary prior coupler designs can be found cited on or in connection with this document, e.g., in the "references cited" section of any issued patent document wherein this text is set forth.

What is claimed is:

1. A ball clamp coupler comprising:
   a. a coupler housing having a coupler socket defined within its interior, the coupler socket having a bottom socket opening whereby a hitch ball may be inserted within the socket opening to rest within the coupler socket;
   b. a ball clamp within the interior of the coupler housing, the ball clamp being movable into and out of the coupler socket;
   c. an actuator bracket affixed to the coupler housing at its exterior;
   d. a clamp driving member affixed to the ball clamp and extending from the interior of the coupler housing to its exterior, and adjacent the actuator bracket;
   e. an actuator lever pivotally affixed to the actuator bracket at a lever pivot, and pivotally and translatably affixed to the clamp driving member at a driving member pivot adjacent the actuator bracket and outside the coupler housing,
      whereby rotating the actuator lever about the lever pivot causes the actuator lever to rotate and translate with respect to the clamp driving member at the driving member pivot and move the clamp driving member within the interior of the coupler housing, and thereby move the ball clamp into and out of the coupler socket.

2. The ball clamp coupler of claim 1 wherein the coupler housing includes a rear wall within its interior, and wherein the ball clamp slides against the rear wall when the actuator lever is pivoted.

3. The ball clamp coupler of claim 2 wherein the rear wall slopes downwardly away from the coupler housing and forwardly toward the coupler socket.

4. The ball clamp coupler of claim 2 includes:
   a. a rear ball clamp face which slides against the rear wall;
   b. an engagement face opposite the rear ball clamp face, the engagement face facing the coupler socket; and
   c. a lower ball clamp face situated between the rear ball clamp face and the engagement face, wherein the lower ball clamp face slopes downwardly and rearwardly away from the coupler socket, whereby the lower ball clamp face, when encountering a hitch ball, will direct the hitch ball toward the coupler socket.

5. The ball clamp coupler of claim 1 wherein a spring is interposed between the ball clamp and the coupler housing, whereby the ball clamp is biased by the spring towards the coupler socket.

6. The ball clamp coupler of claim 1 wherein the ball clamp includes a. an engagement face facing the coupler socket, the engagement face being configured to engage a hitch ball within the coupler socket; and b. a lower ball clamp face situated below and adjacent to the engagement face, wherein the lower ball clamp face slopes downwardly and rearwardly away from the coupler socket.

7. The ball clamp coupler of claim 1 wherein the actuator lever has a latch rotatably mounted thereon, wherein the latch may be rotated to engage the actuator bracket to fix the actuator lever with respect to the actuator bracket.

8. The ball clamp coupler of claim 7 wherein the actuator lever extends rearwardly away from the coupler socket, and wherein the latch is situated on the side of the actuator bracket opposite the coupler socket.

9. The ball clamp coupler of claim 7 wherein the latch is biased to engage the actuator bracket.

10. The ball clamp coupler of claim 1 wherein the actuator lever is pivotally and translatably affixed to the clamp driving member by providing a slot within the actuator lever and a protrusion on the clamp driving member, whereby the protrusion may rotate and translate within the slot.

11. The ball clamp coupler of claim 1 wherein:

a. the actuator bracket has a lever locking aperture defined therein;

b. the actuator lever has a lever locking aperture defined therein; and c. the lever locking aperture and the lever locking aperture are adjacently aligned to receive a locking member when the actuator lever is rotated to situate the ball clamp within the coupler socket.

12. The ball clamp coupler of claim 11 wherein the lever locking aperture is unobstructed to receive a locking member therein when the actuator lever is rotated to withdraw the ball clamp from the coupler socket.

13. The ball clamp coupler of claim 11 wherein the lever locking aperture and the lever pivot are adjacently aligned when the actuator lever is rotated to withdraw the ball clamp from the coupler socket.

14. The ball clamp coupler of claim 11 wherein the actuator bracket further includes a pin access aperture adjacent to the lever locking aperture, wherein the pin access aperture and the lever pivot are adjacently aligned when the actuator lever is rotated to situate the ball clamp within the coupler socket.

15. The ball clamp coupler of claim 1 wherein the lever pivot is unobstructed in a direction coaxial with its axis of rotation when the ball clamp is a. moved to its greatest extent into the coupler socket, and b. moved to its greatest extent out of the coupler socket, thereby allowing maintenance access to the lever pivot when the ball clamp is in the aforementioned positions.

16. A ball clamp coupler comprising:

a. A coupler housing having an interior including:

(1) a coupler socket defined therein, the coupler socket having a bottom socket opening whereby a hitch ball may be inserted within the socket opening to rest within the coupler socket;

(2) a rear wall defined therein adjacent the coupler socket, b. a ball clamp which is guided against the rear wall within the interior of the coupler housing to be situated in varying degrees of insertion within the coupler socket;

c. a clamp driving member affixed to the ball clamp and extending from the interior of the coupler housing to its exterior;

d. an actuator lever pivotally affixed to the coupler housing at a lever pivot, the actuator lever being pivotally and translatably affixed to the clamp driving member at a driving member pivot outside the coupler housing, whereby rotating the actuator lever about the lever pivot causes the actuator lever to rotate and translate with respect to the clamp driving member at the driving member pivot and withdraw the clamp driving member from the interior of the coupler housing, and thereby withdraw the ball clamp from the coupler socket.

17. The ball clamp coupler of claim 16 further comprising an actuator bracket affixed to the exterior of the coupler housing, wherein the lever pivot is situated on the actuator bracket.

18. The ball clamp coupler of claim 17 wherein:

a. the actuator bracket has a lever locking aperture defined therein;

b. the actuator lever has a lever locking aperture defined therein, and c. the lever locking aperture and the lever locking aperture are adjacently aligned to receive a locking member when the actuator lever is rotated to situate the ball clamp within the coupler socket.

19. The ball clamp coupler of claim 18 wherein the lever locking aperture is unobstructed to receive a locking member therein when the actuator lever is rotated to withdraw the ball clamp from the coupler socket.

20. The ball clamp coupler of claim 16 wherein the ball clamp includes:

a. a rear ball clamp face which is guided against the rear wall;

b. a lower ball clamp face situated adjacent the rear ball clamp face, wherein the lower ball clamp face slopes downwardly and rearwardly away from the coupler socket as the ball clamp moves within the coupler interior against the rear wall.

21. The ball clamp coupler of claim 16 wherein the actuator lever is pivotally and translatably affixed to the clamp driving member by providing a slot within the actuator lever and a protrusion on the clamp driving member, whereby the protrusion may rotate and translate within the slot.

22. A ball clamp coupler comprising:

a. A coupler housing having an interior including:

(1) a coupler socket defined therein, the coupler socket having a bottom socket opening whereby a hitch, ball may be inserted within the socket opening to rest within the coupler socket;

(2) a rear wall defined therein adjacent the coupler socket, the rear wall being at least substantially planar;

b. a ball clamp within the interior of the coupler housing, the ball clamp riding against the rear wall to move into and out of the coupler socket;

c. an actuator bracket affixed to the coupler housing at its exterior;
d. a clamp driving member affixed to the ball clamp and extending from the interior of the coupler housing to its exterior, and adjacent the actuator bracket;
e. an actuator lever pivotally affixed to the actuator bracket at a lever pivot, and pivotally affixed to the clamp driving member at a driving member pivot adjacent the actuator bracket and outside the coupler housing, whereby rotating the actuator lever about the lever pivot causes the actuator lever to rotate with respect to the clamp driving member at the driving member pivot and withdraw the clamp driving member from the interior of the coupler housing, and thereby withdraw the ball clamp from the coupler socket.

23. The ball clamp coupler of claim 22 wherein the actuator lever is also translatably affixed to the clamp driving member at the driving member pivot.

* * * * *